Nov. 6, 1934. M. KATZMAN Re. 19,368
ELECTRIC VAPORIZER
Original Filed Jan. 3, 1928
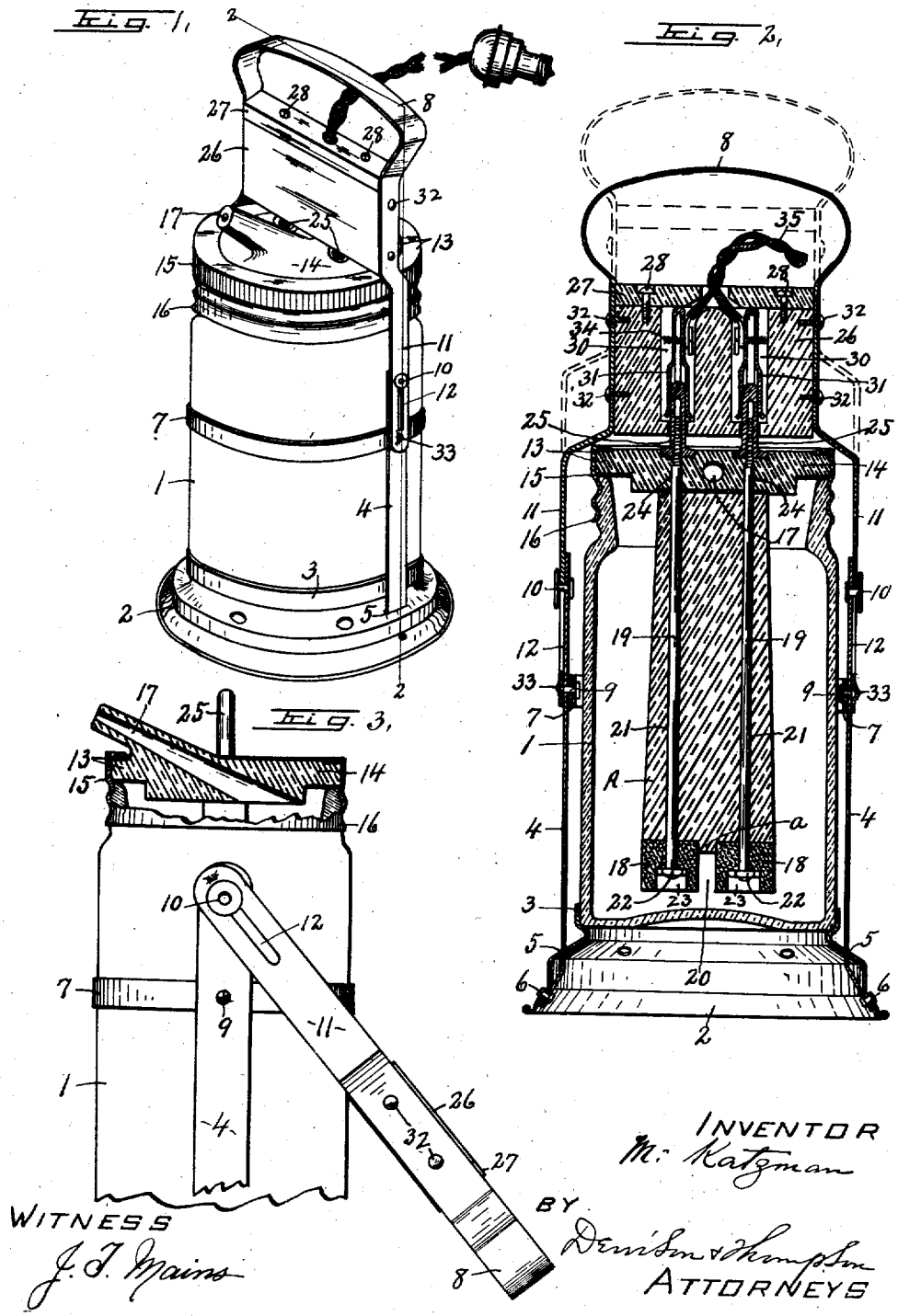

Reissued Nov. 6, 1934

Re. 19,368

UNITED STATES PATENT OFFICE 19,368

ELECTRIC VAPORIZER

Max Katzman, Utica, N. Y., assignor to Kaz Manufacturing Company, Inc., New York, N. Y., a corporation of New York Original No. 1,927,316, dated September 19, 1933, Serial No. 244,217, January 3, 1928. Application for reissue September 12, 1934, Serial No. 743,779

20 Claims. (Cl. 219—40)

This invention relates to an electric vaporizer of the class set forth in my Patent No. 1,628,784, May 17, 1927, except as to certain modifications in the construction of the heater and mounting for the terminal plug, and also in the construction of the cap or cover for the receptacle.

The main object of the present invention is to permanently associate the terminal plug with the receptacle in such manner that it may be moved rectilinearly into and out of engagement with terminals of the heater and also moved laterally or transversely to and from a position above the top or cover of the receptacle.

Another object is to arrange the electrodes in the liquid to be vaporized in such manner that the liquid may have free passage vertically from the underside upwardly and return to assure cleansing of the adjacent sides of the electrodes from foreign matter, and to prevent accumulation of such foreign matter between the electrodes which might otherwise short circuit the same.

A further object is to provide the cover with a vapor discharge nozzle of insulating material to further increase the safety of the device against short circuits, and also to prevent contact of the user with any of the energized conductors of the heater circuit.

Other objects and uses relating to specific parts of the vaporizer will be brought out in the following description.

In the drawing:—

Figure 1 is a perspective view of an electric vaporizer embodying the various features of my invention.

Figure 2 is an enlarged longitudinal sectional view of the same device taken in the plane of line 2—2, Figure 1, the dotted lines indicating the rectilinear adjustment of the terminal plug and its supporting means.

Figure 3 is a side elevation partly in section of the upper portion of the vaporizer in which the supporting bail for the plug is swung laterally and downwardly from its normal operative position.

As illustrated, the receptacle 1 for the liquid to be vaporized is loosely seated at its lower end upon a supporting base 2 preferably of sheet metal spun or otherwise molded to the desired form with its lower end face disposed in a substantially horizontal plane to rest upon a table or other support, and its upper end provided with an annular flange 3 surrounding the lower end of the receptacle.

The frame also comprises a pair of similar arms 4 having their lower ends passed through apertures 5 in the base 2 and secured by rivets 6 to the inner sides of said base at diametrically opposite sides thereof, and their upper ends extended vertically some distance above the upper ends of the base and along corresponding sides of the receptacle 1 in spaced relation thereto for receiving and supporting an annular band or ring 7 and the lower ends of a vertically and laterally movable plug-supporting member or bail 8.

The band 7 is secured by rivets 9 or equivalent fastening means to the intermediate portions of the arms 4 and extends around the periphery of the receptacle 1 to assist in holding the latter in an upright position upon the base 2. A pair of pivotal studs or pins 10 are riveted or otherwise secured to the upper ends of the arms 4 to form limiting stops and pivots for the adjacent ends of the bail 8. This bail 8 is provided with opposite arms 11 extending downwardly along diametrically opposite sides of the receptacle 1 and along the upper ends of the arms 4 so as to overlap on said arms in vertically sliding engagement therewith, the arms 11 being provided with vertically elongated slots 12 through which the corresponding pivotal pins or studs 10 are adapted to project to permit said sliding movement.

These slots 12 are closed at their lower and upper ends and are somewhat longer than the engaging portions of the plug with the heater terminals to permit rectilinear movement of the plug parallel with the axis of the receptacle into and out of engagement with the heater terminals.

The lower walls of the slots cooperate with the studs 10 to limit the vertical movement of the plug out of engagement with the heater terminals, and also serve as pivotal connections between the arms 11 and arms 4 to allow the lateral swinging movement of the bail with the plug thereon when the plug is disengaged from the heater terminals, thus permitting the removal of the receptacle from the frame and the cover from the receptacle.

The receptacle 1 is provided with a removable cover 13 consisting of a disk 14 of insulating material and a peripheral band 15 of sheet metal which is tightly but releasably fitted upon the periphery of the section 14 and is provided with a pendent threaded flange 16 adapted to screw upon a corresponding externally threaded upper end of the receptacle 1.

The insulating section 14 when closed rests upon the upper end of the receptacle 1 to form a liquid and vapor tight joint therewith and is provided with a vertically inclined discharge nozzle 17 extending from one side of the axis laterally and diametrically some distance to the opposite side of the axis for directing the vapor from the interior of the receptacle to the exterior thereof as may be required.

The discharge opening in the insulated section 14 is tapered from its inner end to its outer end to permit the free flow of the vapor therethrough and to discharge it in the form of a relatively small jet with sufficient force to carry the vapor a considerable distance beyond the outlet of the nozzle which is preferably arranged in a plane at right angles to the bail 8 and midway between the electrode conductors of the heater presently described.

A hanger section A of insulating material is secured at its upper end to the underside of the central portion of the cover section 14 to extend downwardly therefrom into the receptacle 1 and within a relatively short distance from the bottom thereof for receiving and supporting a pair of electrodes 18 and conducting rods 19 of the electric heater.

That is, the electric heater comprises, in this instance, a pair of similar rectangular cubes 18 of carbon or equivalent conducting material seated at their upper ends against the lower end of the insulating hanger A in transversely spaced relation to form an intervening water gap 20 which is closed at the top but open at the bottom and at opposite sides to permit free circulation of the liquid from the bottom upwardly between and against the adjacent sides of the electrodes for cleansing the same by the liquid flux, and also to prevent lodgment of any foreign matter between the electrodes which might tend to short circuit the same.

The conducting rods 19 are extended through parallel vertical openings 21 in the hanger section A and are provided at their lower ends with heads 22 seated in corresponding recesses 23 in the lower ends of the electrodes 18 to firmly hold the latter against the lower end face of the section A.

The lower end of the section A is provided with a central transverse rib *a* extending a relatively short distance downwardly between the upper ends of the electrodes 18 to hold the latter in parallel spaced relation against turning movement when securing them in place by the tightening of rods 19.

The upper ends of the conducting rods 19 are passed through registering openings 24 in the insulating section 14 of the cover at opposite sides of the vapor discharge opening 17 and are threaded to receive internally threaded terminals 25 of the heater circuit. These terminals 25 are seated at their lower ends in suitable recesses in the upper side of the section 14 to extend upwardly some distance above the cover and are electrically connected to the electrodes 18 through the medium of the conducting rods 19.

The terminal plug previously mentioned is mounted upon the bail 8 to move therewith into and out of engagement with the terminals 25 and comprises lower and upper sections 26 and 27 of insulating material secured together end to end by screws 28 or equivalent fastening means, both sections being of sufficient transverse width to extend across and some distance beyond opposite sides of the terminals 25, but are relatively narrow in a plane at right angles to the plane of the terminals or of slightly greater horizontal depth than said terminals.

The insulating section 26 is secured to and between the adjacent portions of the arms 11 of the bail 8 by screws 32 or equivalent fastening means. The upper portion of the bail extends some distance above and diametrically across the top of the plug in spaced relation thereto to form a handle by which the entire apparatus may be carried from place to place in an upright position.

The lower ends of the arms 11 of the bail are spring-pressed toward each other and against the adjacent arms 4, and are provided with outwardly pressed portions 33 adapted to ride over and upon the outer rounded ends of the pivots 9 to frictionally hold the bail and plug in their down positions, or rather to establish a frictional lock between the bail and supporting frame for the receptacle 1, and thereby to facilitate the carrying of the receptacle by means of the bail 8 when desired.

The plug terminals 31 are provided with binding posts 34 to which are connected suitable lead and return wires 35 of the heater circuit.

The supporting frame for the receptacle, including the base 2, arms 4 and band or ring 7, constitutes a connection between the bail and receptacle, while the bail forms a support for the terminal plug for moving said plug into and out of engagement with the terminals of the heater, and also to and from a position across the cover of the receptacle.

It is evident from the foregoing description and the accompanying drawing that when the terminal plug is in operative engagement with the terminals 25 of the heater, it would not be possible to remove the cover from the receptacle nor the receptacle from the frame while the plug is in engagement with said terminals.

In other words, the cover 13 constitutes a removable lid for the receptacle 1, while the electric heater comprising the electrodes 18 and conductors 19 are suspended from said lid and are provided with outwardly projecting terminals 25 for engagement with an electric plug.

The supporting frame for the receptacle and the bail 8 constitutes means engaging said receptacle and said plug to prevent the removal of said lid while the plug is in engagement with said terminals.

The electrodes of the heater are adapted to be submerged in the contents of the receptacle so that when energized by the closing of the heater circuit or by moving the electric plug into engagement with the terminal of the circuit, the liquid between the electrodes 18 in the water-gap 20 will be heated and its heat transferred to the remaining portions of the liquid to vaporize the same and allow the vapor to escape through the discharge nozzle 17.

The construction shown and described is particularly compact and efficient in expeditiously converting the liquid into vapor but it is obvious that various changes might be made in the detail construction without departing from the spirit of this invention.

The purpose in preventing the removal of the cover 14, while the electric plug is in engagement with the terminals 25 of the heater, is to prevent contact of the user with any of the live conductors of the heater circuit and heater when the cover with the heater thereon is removed from the receptacle.

For example, when the electric plug is removed from the heater terminals the circuit to the heater will be broken while the terminals 31 of said circuit will be enclosed and concealed within the insulating block 26 so that no parts thereof will be exposed to contact with the hands of the user.

It is also evident that, when the electric plug is removed from the heater terminals, the current to the heater will also be cut off so that by swinging the bail 8 carrying the electric plug laterally from a position over the cover 14 to a position at one side thereof the cover with the heater thereon may be readily unscrewed or removed from the receptacle 1, at which time the electrodes 18 and conductors 19 and terminals 25 of the heater will be disconnected from the heater circuit and may be safely cleansed or adjusted without danger to the user.

It is now clear that as long as the electric plug 26 is engaged with the terminals 25, as shown in Figure 1, it will be impossible to turn or remove the cover 13 and heating unit from the receptacle, or to turn or remove the receptacle from its supporting frame by reason of the fact that the plug is secured to the bail 8 and that the bail is pivoted to the frame members 4 which, in turn, are secured to the base member 2, thus preventing exposure of the heater to handling until the plug is removed from the terminals 25.

On the other hand, when the bail 8 with the plug thereon is drawn upwardly for disengaging the plug from the terminals 25 to the position shown by dotted lines in Figure 2, the heater circuit will be broken and the bail and plug may then be rocked laterally about the pivots 10 to one side of the cover, as shown in Figure 3, thus permitting the removal of the cover with the heater thereon and also permitting the removal of the bottle from the frame by upward displacement, if desired, under which conditions the heating element may be handled or cleansed without liability of injury to the user from the heating circuit.

I claim:

1. In an electric liquid vaporizer, a frame, a receptacle for the liquid mounted on the frame, a cover for the receptacle, an electric heater having terminals mounted on the cover, a bail slidably and hingedly mounted on the frame to move lengthwise and transversely of the receptacle, and a terminal engaging plug mounted on the bail to move therewith into and out of engagement with the heater terminals.

2. In an electric liquid vaporizer, a frame, a receptacle for the liquid, a cover for the receptacle, an electric heater within the receptacle having terminals on the cover, a terminal plug movable into and out of engagement with said terminals, and a bail slidably mounted on the frame and secured to the plug for moving said plug into and out of engagement with the terminals on the cover.

3. In an electric vaporizer, a receptacle for the liquid, a cover for the receptacle, an electric heater within the receptacle having terminals on the cover, means for carrying the receptacle including a bail movable toward and from the cover, and a terminal plug mounted on the bail and movable therewith into and out of engagement with said terminals.

4. In an electric liquid vaporizer, a receptacle for the liquid, a cover for the receptacle, an electric heater having terminals on the cover, a terminal plug, and a support for the plug operatively connected to the receptacle and movable lengthwise thereof for engaging and disengaging the plug with and from the terminals.

5. In an electric liquid vaporizer, a receptacle for the liquid, a cover for the receptacle, an electric heater having terminals on the cover, a terminal plug, and a support for the plug operatively connected to the receptacle and having a limited rectilinear movement relatively to and parallel with the axis of the receptacle for engaging and disengaging the plug with and from the terminals.

6. An electric vaporizer comprising a receptacle for the liquid to be vaporized, a removable lid for the receptacle, an electric heater suspended from the lid and having outwardly projecting terminals, an electric plug movable into and out of engagement with said terminals and connections between the receptacle and plug to prevent removal of the lid while the plug is engaged with said terminals.

7. An electric vaporizer comprising a receptacle for the liquid to be vaporized having a removable lid, an electric heater having terminals on the lid, an electric plug movable into and out of engagement with said terminals and holding the lid against removal while engaged with the terminals.

8. An electric vaporizer comprising a receptacle for the liquid to be vaporized, a lid for the receptacle having a section of insulating material provided with a discharge opening, and an electric heater suspended from the insulator section of the lid within the receptacle.

9. An electric vaporizer comprising a receptacle having a lid section of insulating material provided with a vapor discharge opening, an electric heater suspended from said section within the receptacle, and an electric plug movable into and out of electrical connection with the heater.

10. In an electric vaporizer, a container for the liquid to be vaporized, a removable lid for the container, an electric heater suspended from the lid and provided with terminals on the lid, an electric plug movable into and out of engagement with the terminals, and means for holding the plug against turning movement when engaged with the terminals on the lid.

11. An electric vaporizer comprising a receptacle, a removable lid therefor, an electric heater suspended from said lid and having outwardly projecting terminals for the engagement of an electric plug and means engaging said receptacle and said plug to prevent the removal of said lid while the plug is in engagement with said terminals.

12. An electric vaporizer comprising a receptacle, a removable lid therefor, an electric heater suspended from the lid and having outwardly projecting terminals for the engagement of an electric plug, and means for preventing removal of the lid while the plug is in engagement with the terminals.

13. An electric vaporizer comprising a receptacle having a removable lid, a supporting frame for the receptacle, an electric heater suspended from the lid and having outwardly projecting terminals for the engagement of an electric plug, and means for preventing removal of the receptacle from the frame while the plug is engaged with the terminals.

14. In an electric vaporizer, the combination with a frame and a receptacle removably mounted on the frame, a removable lid for the receptacle, an electric heater suspended from the lid and having outwardly projecting terminals for the engagement of an electric plug, and means for preventing removal of the receptacle from the frame and also for preventing removal of the lid from the receptacle while the plug is in engagement with the terminals.

15. An electric vaporizer comprising a frame, a receptacle, a removable lid therefor, an electric heater suspended from the lid and provided with terminals for the engagement of an electric plug, and means connected to the frame for preventing removal of the lid while the plug is in engagement with the terminal.

16. An electric vaporizer comprising a receptacle having a removable lid, an electric heater suspended from the lid and provided with terminals for the engagement of an electric plug, and means engaging the receptacle for preventing removal of the lid while the plug is in engagement with the terminals.

17. In a device for vaporizing liquids by an electric current, a receptacle for containing the liquid to be vaporized, a removable cover adapted to be applied to the open end of the receptacle in vapor-tight engagement therewith, said cover having a vapor outlet, a pair of electrodes suspended from the cover for immersion in the liquid to be vaporized, terminals on the outside of the cover and in electrical connection through the cover with the electrodes, a frame for supporting and carrying the receptacle, and means connected to the frame and arranged so as to prevent removal of the cover while the terminals are in electrical connection with a source of current.

18. In a device for vaporizing liquids by an electric current, a receptacle for containing the liquid to be vaporized, a removable cover adapted to be applied to the open end of the receptacle in vapor-tight engagement therewith, a pair of electrodes suspended from the cover for immersion in the liquid to be vaporized, terminals on the outside of the cover and in electrical connection through the cover with the electrodes, a member engaging the receptacle, and means connected to said member and arranged so as to prevent removal of the cover while the terminals are in electrical connection with a source of current.

19. In a device for vaporizing liquids by an electric current, a receptacle for containing the liquid to be vaporized, a removable cover for the receptacle, a pair of electrodes suspended from the cover for immersion in the liquid to be vaporized, terminals on the outside of the cover and in electrical connection with the electrodes, and means engaging the receptacle and arranged so as to prevent removal of the cover while the terminals are in electrical connection with a source of current.

20. In a device for vaporizing liquids by an electric current, a receptacle containing the liquid to be vaporized, a removable cover adapted to be applied to the open end of the receptacle in vapor-tight engagement therewith, said cover having an opening through which vapor generated in the receptacle is discharged, a spout having a restricted outlet in registry with said opening, a pair of electrodes suspended from the cover for immersion into the liquid to be vaporized, terminals on the outside of the cover and in the electrical connection through the cover with the electrodes, and means engaging the receptacle and aranged so as to prevent removal of the cover while the terminals are in electrical connection with a source of current.

MAX KATZMAN.